April 6, 1943. R. M. NARDONE 2,316,121
ENGINE STARTING MECHANISM
Filed June 12, 1941 3 Sheets-Sheet 3

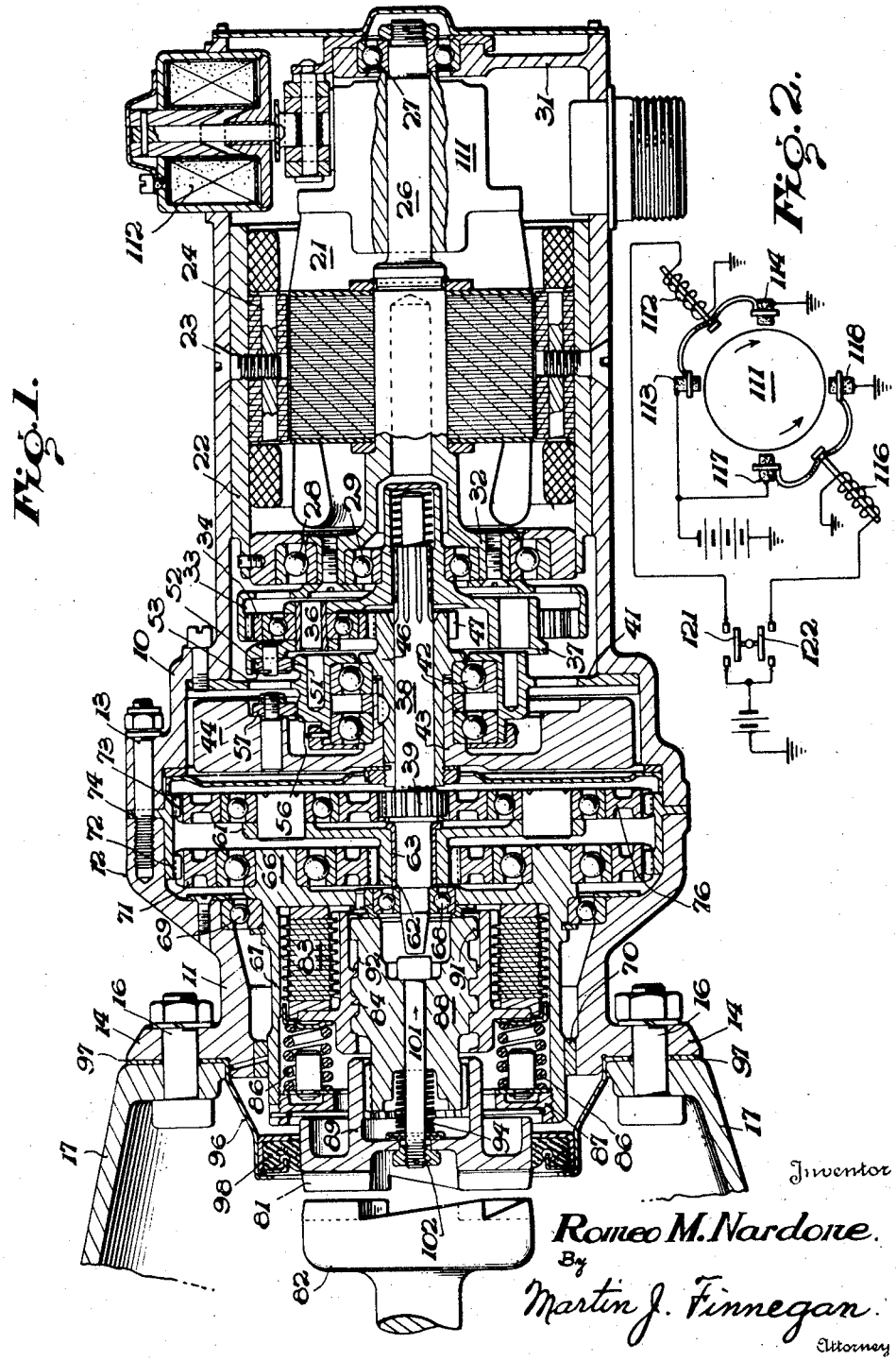

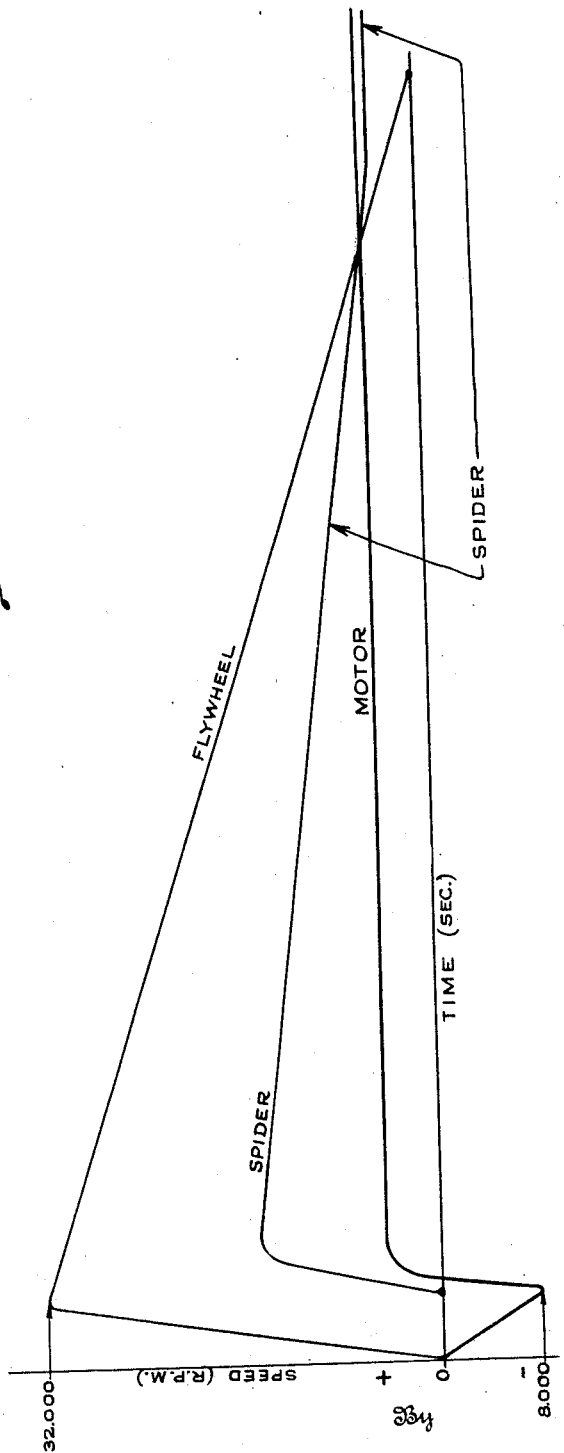

Inventor
Romeo M. Nardone.
By Martin J. Finnegan.
Attorney

Patented Apr. 6, 1943

2,316,121

UNITED STATES PATENT OFFICE 2,316,121

ENGINE STARTING MECHANISM

Romeo M. Nardone, Westwood, N. J., assignor to Bendix Aviation Corporation, South Bend, Ind., a corporation of Delaware Application June 12, 1941, Serial No. 397,794

3 Claims. (Cl. 123—179)

This invention relates to engine starting mechanism and more particularly to a starting mechanism of the inertia type, in which there is a period of energy storage in an "inertia" element (flywheel, for example) prior to movement of the engine-engaging, or cranking element, to cranking engagement with the member of the engine to which initial rotary movement is to be imparted.

Objects of the present invention are to make advantageous use of all the energy of the flywheel all the way down to zero flywheel speed; and to minimize the shock of engagement. The latter I propose to bring about by engaging the starter and engine jaws at zero rotary speed, thereafter increasing the rotative speed of the starter jaw. In this connection a feature of the invention, as claimed herein, involves the fact that although the engine-engaging jaw is at all times mechanically connected to the flywheel of the starter, said jaw nevertheless remains stationary and immovable while the flywheel is being accelerated to its normal speed, which (in the tests thus far made) is 32,000 R. P. M. Hence when engagement occurs the jaw is at zero speed.

Another object is to crank the engine at speeds over and above that which would normally obtain with a fixed gear ratio between flywheel and engine-engaging jaw, the cranking speed being characterized by a tendency to increase during at least the initial stage of the run-down period of the flywheel, rather than to decelerate therewith, as has been the tendency heretofore.

A further object is to make possible direct-cranking, when desired, independently of any flywheel rotation.

Still another object is to produce a direct cranking action by use of energy from a prime mover additional to the flywheel, said prime mover being operative, first, to accelerate the flywheel, and subsequently—upon reversal in its direction of rotation—being instrumental in establishing connection between the starter and engine, and also in helping the flywheel to speed up the engine and continue to transfer energy thereto even after the flywheel has come to a complete stop, and so long as is necessary to insure effective starting.

A starter embodying the principles above described, and adapted to achieve the foregoing objectives, is illustrated in my co-pending application No. 296,681, filed September 26, 1939, (now Patent No. 2,279,126, granted April 7, 1942) in which application certain features of the invention are claimed. Other—that is, divisible—features common to the two disclosures, as well as the specific features which distinguish the present disclosure from the disclosure of the co-pending case just referred to, are claimed herein.

In the drawings:

Fig. 1 is a longitudinal sectional view of a device embodying the invention;

Fig. 2 is a diagram of the electrical connections;

Fig. 3 is a graph of speed relationships; and

Figure 6:
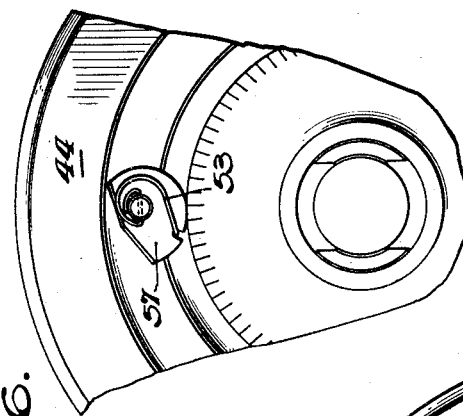
Figs. 4, 5 and 6 show one of the two pawl assemblies.

The invention is illustrated in the accompanying drawings as embodied in a housing having an outer section 10 and an inner section 11 with a suitable flange 12 to receive bolts 13 for detachably connecting said sections. The inner section 11 is provided with a second flange 14 having apertures 16 to receive bolts for securing the starter to the crankcase of an engine, a portion of the latter being indicated at 17. Within section 10 is an electric motor 21 provided with a casing 22 having apertures to receive screws 23 which hold the field units 24, the casing 22 and section 10 in assembled relationship.

The motor 21 may be of any suitable type embodying an armature shaft 26 that is rotatably mounted in suitable bearings 27, 28, and 29, the first-named of which is secured in a transversely extending wall 31 of housing section 10. Drivably connected to the outwardly flaring portion 32 of the armature shaft is an internally toothed annulus gear 33 that meshes with a planetary idler pinion 34 rotatably carried on spindle 36 of a spider 37 whose hub is splined to a centrally disposed shaft 38 having formed thereon a pinion 39 constituting the sun gear of a planetary gearing set. The transverse plate 41 of section 10 supports therein a double bearing 42 within which rotates the hub 43 of the flywheel 44, also the sleeve 46 to which said hub 43 is keyed as indicated. Said sleeve 46 also has integral therewith a pinion 47 meshing with planetary idler 34, and constituting the "sun," or central element of the planetary set composed of parts 33, 34, 37 and 47. Transverse plate 41 includes a smooth circular surface 51 engageable by pawls 52 pivotally carried by spider 37, the pawls being urged into the engaging position by light torsion springs 53, wherefore the spider 37 is constrained against rotation in one direction but is free to rotate in the opposite direction. A second smooth circular surface 56 on plate 41 is engageable by pawls 57 pivotally carried by flywheel 44, thereby restricting flywheel 44 to rotation in a single direction only.

The second planetary system includes a planet carrier 61 integral with a sun gear 62, and is rotatably mounted as by means of a bearing 63 on that portion of stub shaft 38 which extends beyond pinion 39. A second planet carrier 66 is an integral part of a barrel 67 having a transverse wall to receive ball-bearing assembly 68 in which the stub shaft 38 rotates. Ball bearings 69 carried by the inner housing section 11 are preferably employed for rotatably mounting the barrel 67, and bearing 70 acts similarly.

Sun gear 62 meshes with a plurality of planetary gears 71 that are rotatably mounted on the carrier 67 and mesh with one set of teeth 72 of an annulus gear 74 which is fixedly mounted between the housing sections 10 and 11 by means of bolts 13. This gear 74 includes a second set of teeth, 73, and these mesh with planets 76 which are rotatably mounted on carrier 61.

The electric motor 21 is adapted to drive an engine-engaging member 81 through the train of reduction gearing described above. The member 81 constitutes one element of a jaw clutch, the other element being formed by a member 82, carried by a rotating part of the engine to be cranked, such as the engine crankshaft or an extension thereof. There is also preferably employed the usual multiple disk clutch embodying a plurality of friction disks 83, a number of said disks being splined to the inner surface of barrel 67, and the remainder being splined to the outer surface of an interiorly threaded nut 84. Resilient means such as a plurality of coil springs 86 and an adjusting nut 87, which is threaded into the inner end of barrel 67, are provided for varying the pressure with which disks 83 are maintained in engagement.

Mounted for rotary and longitudinal movement within nut 84 is the usual threaded shaft 88 which is longitudinally splined at its inner end to drivably engage a correspondingly splined, tubular and outwardly extending portion 89 of the jaw clutch member 81. Movement of threaded shaft 88 to the left, as viewed in Fig. 1, relative to nut 84 is positively limited by means of the head portion 91 on the outer end of shaft 88 and constituting a stop for engagement with a shoulder 92 formed interiorly of nut 88. Preferably a coil spring 94 is interposed between jaw clutch member 81 and shaft 88, a portion of said spring extending into a recess formed in the inner end of the shaft, to yieldably resist relative movement of the parts.

The starter is preferably provided with the usual oil sealing means for preventing oil in the engine crankcase from seeping into the starter housing. This includes a cup-shaped member 96 that is preferably formed of metal and is provided with a flange 97 on the outer end thereof, said flange being adapted to be clamped between flange 14 of the starter housing and the engine crankcase. The inner portion of member 96 is bent inwardly toward jaw member 81, and is provided with a central opening which is slightly larger in diameter than the outer diameter of the head of jaw member 81, and receives the sealing material 98.

There is also preferably provided the usual rod 101 which extends through screw shaft 88 and a central opening in the hub of member 81. The inner portion of rod 101 is of enlarged diameter to provide a head which normally abuts against the end of shaft 88. The outer end of rod 101 is threaded to receive a nut 102 which abuts the hub of jaw member 81 and coacts with the head of rod 101 to retain members 88 and 81 in operative relationship.

The motor 21 is built with four brushes, all of which are normally off the commutator 111, as shown in Fig. 2. One solenoid (112) is mechanically connected to brushes 113 and 114, while the second solenoid (116) is mechanically connected to brushes 117 and 118. Switches 121 and 122 (manually operable) control the selective energization of the solenoids 112 and 116, and thus determine the direction of rotation; the direction of current flow through the armature being different for each brush set, as shown.

In operation, switch 121 is first closed, energizing solenoid 112 to engage brushes 113 and 114 with the commutator, thus causing the motor armature to rotate in the flywheel-accelerating direction.

During flywheel acceleration, planetary spider 37 is held stationary (by pawls 52) and therefore the planetary sets driven by shaft 38, as well as starter barrel 67, do not rotate. After proper flywheel speed is obtained, the direction of motor rotation is reversed by opening switch 121 and closing switch 122, thus cutting off the current to solenoid 112 and sending it through the solenoid 116. When this circuit change is made, the motor rapidly decelerates to zero, under the action of the reverse current, and begins opposite rotation. The resulting reaction causes spider 37 to rotate (the pawls 52 overrunning) and spider 37 in turn causes pinion 39 and all planets driven thereby to rotate, which rotation is of course communicated to the starter barrel 67. This results in immediate screw action at 84, 88, whereupon starter jaw 81 starts to move forward into engagement with the engine jaw. Engagement is therefore at zero speed and zero torque; hence there is no slippage at clutch 83. When this reversal of gear 33 occurs, its speed is added to that of the flywheel pinion 47, thus imparting increased speed to spider 37 which drives pinion 39 of the planetary system. Rotation of spider 37 begins when the motor speed reduces, and increases in direct proportion to motor speed reduction, wherefore soon after the motor starts its reverse rotation the spider speed is at its maximum (see Fig. 3).

As the flywheel approaches zero speed, pawls 57 take hold and prevent flywheel rotation in the reverse direction. Gear 33 and spider 37 continue to be rotated by the motor and the engine is cranked at a speed corresponding to motor speed divided by the ratio between it and the jaw 81. Direct cranking (from motor 21 to jaw 81) may thus continue until the engine "starts."

It will be seen that all of the energy initially stored in the flywheel is entirely used up in cranking the engine due to the fact that the flywheel is caused to come to a complete stop and held stationary while the electric motor continues to directly crank the engine. This feature is not found in other starters of the inertia-direct cranking type where the flywheel is mounted on the motor shaft and rotates with it as long as the motor is running. In the latter starters, the energy stored in the flywheel, when the engine starts during the direct cranking operation, is entirely lost and useless.

The starter may also be used initially as a direct cranking unit without the necessity of first accelerating the flywheel. During this operation, the flywheel remains stationary and is not carried along with the motor as is the case with other starters of this type and therefore does not decrease the efficiency and performance of the motor and of the starter as a whole.

Although shown diagrammatically as separate "switches" in Fig. 2, the parts 121 and 122 are, in practice, adapted for alternate operation by a single manual actuator, such as a push-pull handle, or tumbler, wherefore only one may be closed at any one time. Springs or equivalents (not shown) normally hold all brushes off the commutator, and yieldably oppose brush engagement with the commutator, and act to disengage the brushes again, immediately upon deenergization of the particular solenoid associated therewith; the brushes acting in pairs, as heretofore explained and as more fully illustrated and described in my copending application No. 387,540, filed April 8, 1941. Of course, other conventional means of motor reversal could be substituted for the solenoids 112 and 116.

Figure 5:
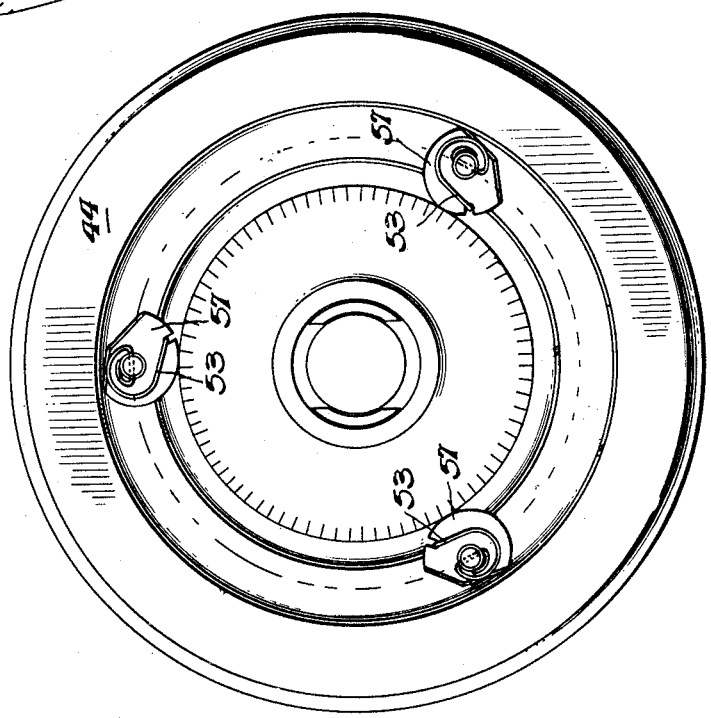
Figure 4:
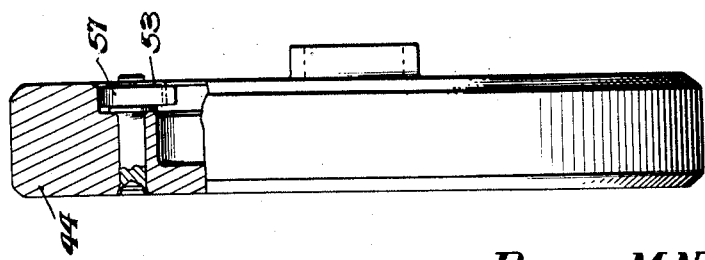

Figs. 4, 5 and 6 show (more clearly than does Fig. 1) the relationship of the pawls 57 to the flywheel on which they are eccentrically mounted; and it is to be understood that pawls 52 bear the same relationship to spider 37. (In fact, the pawls 52 and the pawls 57 are preferably of identical construction with identical springs 53.) When the direction of engine rotation is such as to require free-running of the flywheel in the counter-clockwise direction, the pawls are mounted as shown in Fig. 5. When the reverse is true, that is, when the installation is such as to require free-running in the clockwise direction, the pawls are reversely mounted with respect to the flywheel, as shown in Fig. 6. The same is true of pawls 52.

In the claims the word "frame" refers to spider 37 (or any equivalent substitute therefor).

To simplify illustration of the complete assembly only one of the set of planets 34 is actually shown in Fig. 1, but of course there are additional planets evenly spaced about the sun gear 47 with which they mesh and all are carried by the spider 37 in the same fashion as the planets 76 are carried by the spider 61.

What is claimed is:

1. In an engine starter, the combination of a rotating inertia member, means for driving the inertia member including a driving gear, a driven gear and an intermediate reactance gear, said reactance gear being rotatably mounted in a rotatable frame, means for connecting said rotatable frame to the engine in a manner to crank the same, means including a part pivotally mounted on said frame and a cooperating stationary part for preventing rotation of the frame in one direction, and means for reducing the speed of the driving gear whereby the reaction force on the frame is reversed and the frame is rotated in a direction to crank the engine.

2. In an engine starter, the combination of a rotating inertia member, means for driving the inertia member including a rotatable gear-carrying frame, means for connecting said rotatable frame to the engine in a manner to crank the same, means including a part pivotally mounted on said frame and a cooperating stationary part for preventing rotation of the frame in one direction, and means for reversing the reaction force on the frame to rotate the latter in a direction to crank the engine.

3. In an engine starter, the combination of driving means including a driving gear, a driven gear and an intermediate reactance gear, said reactance gear being rotatably mounted in a rotatable frame, means for connecting said rotatable frame to the engine in a manner to crank the same, means including a part pivotally mounted on said frame and a cooperating stationary part for preventing rotation of the frame in one direction, and means for reducing the speed of the driving gear whereby the reaction force on the frame is reversed and the frame is rotated in a direction to crank the engine.

ROMEO M. NARDONE.